United States Patent
Keskin et al.

(10) Patent No.: US 10,203,751 B2
(45) Date of Patent: Feb. 12, 2019

(54) CONTINUOUS MOTION CONTROLS OPERABLE USING NEUROLOGICAL DATA

(71) Applicant: Microsoft Technology Licensing, LLC, Redmond, WA (US)

(72) Inventors: Cem Keskin, Seattle, WA (US); Khuram Shahid, Seattle, WA (US); Bill Chau, Sammamish, WA (US); Jaeyoun Kim, Issaquah, WA (US); Kazuhito Koishida, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 324 days.

(21) Appl. No.: 15/152,403

(22) Filed: May 11, 2016

(65) Prior Publication Data

US 2017/0329392 A1 Nov. 16, 2017

(51) Int. Cl.
| | |
|---|---|
| G09G 5/00 | (2006.01) |
| G06F 3/01 | (2006.01) |
| G06F 3/16 | (2006.01) |
| G06T 19/00 | (2011.01) |
| G06F 3/0484 | (2013.01) |

(52) U.S. Cl.
CPC .............. G06F 3/011 (2013.01); G06F 3/015 (2013.01); G06F 3/017 (2013.01); G06F 3/04847 (2013.01); G06F 3/165 (2013.01); G06T 19/006 (2013.01); *G06T 2200/24* (2013.01)

(58) Field of Classification Search
CPC .......... G06F 3/011; G06F 3/017; G06F 3/165; G06F 3/04847; G06F 3/015; G06F 2203/013; G06F 2203/014; G06F 2203/015; G06F 3/012; G06F 3/013; G06T 19/006
USPC .................................................. 345/156–157
See application file for complete search history.

(56) References Cited

U.S. PATENT DOCUMENTS

| | | | |
|---|---|---|---|
| 5,617,855 | A | 4/1997 | Waletzky et al. |
| 5,899,867 | A | 5/1999 | Collura |
| 6,243,096 | B1 | 6/2001 | Takanashi |

(Continued)

FOREIGN PATENT DOCUMENTS

| | | |
|---|---|---|
| EP | 2344031 | 10/2014 |
| WO | 2014138925 | 9/2014 |

(Continued)

OTHER PUBLICATIONS

"International Search Report and the Second Written Opinion issued in PCT Application No. PCT/US201703177", dated Jul. 12, 2017.

(Continued)

*Primary Examiner* — Jennifer T Nguyen
(74) *Attorney, Agent, or Firm* — Workman Nydegger

(57) ABSTRACT

Computer systems, methods, and storage media for generating a continuous motion control using neurological data and for associating the continuous motion control with a continuous user interface control to enable analog control of the user interface control. The user interface control is modulated through a user's physical movements within a continuous range of motion associated with the continuous motion control. The continuous motion control enables fine-tuned and continuous control of the corresponding user interface control as opposed to control limited to a small number of discrete settings.

20 Claims, 7 Drawing Sheets

(56) References Cited

U.S. PATENT DOCUMENTS

| | | | |
|---|---|---|---|
| 6,494,830 | B1 | 12/2002 | Wessel |
| 7,554,549 | B2 | 6/2009 | Sagar et al. |
| 7,580,742 | B2 | 8/2009 | Tan et al. |
| 8,020,104 | B2 | 9/2011 | Robarts et al. |
| 8,157,731 | B2 | 4/2012 | Teller et al. |
| 8,203,530 | B2 | 6/2012 | Chiang |
| 8,786,546 | B1 | 7/2014 | Bendickson et al. |
| 8,788,951 | B2 | 7/2014 | Zalewski et al. |
| 9,030,495 | B2 | 5/2015 | McCulloch et al. |
| 9,031,293 | B2 | 5/2015 | Kalinli-Akbacak |
| 2005/0017870 | A1 | 1/2005 | Allison et al. |
| 2006/0224046 | A1 | 10/2006 | Ramadas et al. |
| 2008/0214902 | A1 | 9/2008 | Lee et al. |
| 2008/0255702 | A1 | 10/2008 | Lin |
| 2009/0327171 | A1 | 12/2009 | Tan et al. |
| 2010/0234752 | A1 | 9/2010 | Sullivan et al. |
| 2011/0152710 | A1 | 6/2011 | Kim et al. |
| 2012/0011477 | A1 | 1/2012 | Sivadas |
| 2012/0212406 | A1 | 8/2012 | Osterhout et al. |
| 2012/0257035 | A1 | 10/2012 | Larsen |
| 2014/0058528 | A1 | 2/2014 | Contreras-Vidal et al. |
| 2014/0169596 | A1 | 6/2014 | Lunner et al. |
| 2014/0191939 | A1 | 7/2014 | Penn et al. |
| 2014/0266982 | A1 | 9/2014 | Nepveu |
| 2014/0342818 | A1 | 11/2014 | Smith et al. |
| 2014/0349256 | A1 | 11/2014 | Connor |
| 2014/0354534 | A1 | 12/2014 | Mullins |
| 2014/0369537 | A1 | 12/2014 | Pontoppidan et al. |
| 2015/0012426 | A1 | 1/2015 | Purves et al. |
| 2015/0045007 | A1 | 2/2015 | Cash |
| 2015/0070270 | A1 | 3/2015 | Bailey et al. |
| 2015/0105111 | A1 | 4/2015 | Rodriguez |
| 2015/0296152 | A1 | 10/2015 | Fanello et al. |
| 2016/0239084 | A1* | 8/2016 | Connor ............... A61B 5/0478 |
| 2017/0180336 | A1* | 6/2017 | Josephson ............... H04L 63/06 |

FOREIGN PATENT DOCUMENTS

| | | |
|---|---|---|
| WO | 2014151874 | 9/2014 |
| WO | 2015090430 | 6/2015 |
| WO | 2015102733 | 7/2015 |

OTHER PUBLICATIONS

"Notice of Allowance" issued in U.S. Appl. No. 15/152,401 dated Sep. 12, 2017.
Tsui, Chun Sing Louis, et al.: "A Self-Paced Brain-Computer Interface for Controlling a Robot Simulator: An Online Event Labelling Paradigm and an Extended Kalman Filter Based Algorithm for Online Training", Feb. 19, 2009, pp. 257-265.
Mahmoidi, Babak, et al.: "Electro-encephalogram Based Brain-Computer Interface: Improved Performance by Mental Practice and Concentration Skills", Oct. 7, pp. 959-969.
"International Search Report and the Second Written Opinion in PCT Application No. PCT/US2017/030943," dated Aug. 4, 2017.
U.S. Appl. No. 15/152,401, filed May 11, 2016, Keskin et al.
"Facial Expression Detections", Retrieved on: Dec. 3, 2015 Available at: https://emotiv.zendesk.com/hc/en-us/articles/201216295-Facial-Expression-Detections.
"Kokoon EEG Headphones", Published on: Jun. 13, 2015 Available at: http://drishtimagazine.com/kokoon-eeg-headphones/.
"Moving (Virtual) Mountains—Just With the Power of Thoughts", Published on: Feb. 11, 2015 Available at: https://hololens.wordpress.com/tag/eeg/.
Abhang, et al., "Emotion Recognition using Speech and EEG Signal—A Review", In International Journal of Computer Applications, vol. 15, No. 3, Feb. 2011, pp. 37-40.
Bieliková, Mária, "A Body-Monitoring System with EEG and EOG Sensors", In ERCIM News No. 51, Oct. 2002, 2 pages.
Choi, et al., "Enhanced Perception of User Intention by Combining EEG and Gaze-Tracking for Brain-Computer Interfaces (BCIs)", In Journal of Sensors, vol. 13, Issue 3, Mar. 13, 2013, pp. 3454-3472.
Chun, et al., "Real-Time Face Pose Tracking and Facial Expression Synthesizing for the Animation of 3D Avatar", In Proceedings of Second International Conference on Technologies for E-Learning and Digital Entertainment, Jun. 11, 2007, 2 pages.
Fukahori, et al., "Exploring Subtle Foot Plantar-based Gestures with Sock-placed Pressure Sensors", In Proceedings of the 33rd Annual ACM Conference on Human Factors in Computing Systems, Apr. 18, 2015, 10 pages.
Hondrou, et al., "Affective, Natural Interaction Using EEG: Sensors, Application and Future Directions", In Proceedings of 7th Hellenic Conference on Artificial Intelligence: Theories and Applications, May 28, 2012, pp. 331-338.
Hornero, et al., "Brain Computer Interface (BCI) Systems Applied to Cognitive Training and Home Automation Control to offset the Effects of Ageing", In Publication of Lychnos, No. 8, Mar. 2012, 6 pages.
Hossain, Munshi Asif, "Detection of Fast & Slow Hand and Foot Movement using EEG signals", In Thesis of Jadavpur University, May 2014, 90 pages.
Kiguchi, et al., "Estimation of User's Hand Motion based on EMG and EEG Signals", In Proceedings of World Automation Congress, Aug. 3, 2014, pp. 1-5.
Kilicarslan, et al., "High Accuracy Decoding of User Intentions Using EEG to Control a Lower-Body Exoskeleton",In Proceedings of 35th Annual International Conference of the IEEE Engineering in Medicine and Biology Society, Jul. 3, 2013, pp. 5606-5609.
Lana, et al., "Detection of Movement Intention Using EEG in a Human-Robot Interaction Environment", In Journal of Research on Biomedical Engineering, Nov. 30, 2015, 10 pages.
Li, et al., "Estimation of Eye Closure Degree Using EEG Sensors and Its Application in Driver Drowsiness Detection", In Journal of Sensors, Sep. 18, 2014, pp. 17491-17515.
Liao, et al., "Gaming control using a wearable and wireless EEG-based brain-computer interface device with novel dry foam-based sensors", In Journal of NeuroEngineering and Rehabilitation, Jan. 28, 2012, pp. 1-11.
Liu, et al., "Real-time EEG-based Emotion Recognition and its Applications", In Publication of Transactions on computational science XII, Jan. 1, 2011, 23 pages.
Lv, et al., "Hand-free motion interaction on Google Glass", In Proceedings of Mobile Graphics and Interactive Applications, Dec. 3, 2014, 1 page.
Mohammadi, et al., "EEG based foot movement onset detection with the probabilistic classification vector machine", In Proceedings of the 19th international conference on Neural Information Processing—vol. Part IV, Nov. 12, 2012, 2 pages.
O'Regan, et al., "Automatic detection of EEG artefacts arising from head movements using EEG and gyroscope signals", In Journal of Medical Engineering & Physics, vol. 35, Issue 7, Jul. 2013, 2 pages.
Poulios, et al., "Multi-sensor Interactive Systems for Embodied Learning Games", In Proceeding of the 10th International Conference on Advances in Computer Entertainment—vol. 8253, Nov. 12, 2013, 2 pages.
Rached, et al., "Emotion Recognition Based on Brain-Computer Interface Systems", In Proceedings of Third International Conference on Innovative Computing Technology, Aug. 29, 2013, pp. 253-270.
Vera, et al., "Augmented Mirror: Interactive Augmented Reality System based on Kinect", In Proceedings of the 13th IFIP TC 13 international conference on Human-computer interaction—vol. Part IV, Sep. 5, 2011, pp. 1-5.
Wehbe, et al., "EEG-Based Assessment of Video and In-Game Learning", In Proceedings of Extended Abstracts on Human Factors in Computing Systems, Apr. 27, 2013, 6 pages.

* cited by examiner

CONTINUOUS MOTION CONTROLS OPERABLE USING NEUROLOGICAL DATA

BACKGROUND

Neurological data can be gathered through a variety of techniques. One non-invasive technique is electroencephalography (EEG), which involves the placement of electrodes along the scalp of a user or subject to measure voltage fluctuations resulting from ionic current within the neurons of the brain. EEG is often used in clinical contexts to monitor sleep patterns or to diagnose epilepsy.

Computer system user interfaces typically include a variety of user interface controls enabling a user to interact with the computer system through the user interface. In most circumstances, the user interface controls rely on various input/output devices, such as keyboards, touchpads, mouse controls, game controllers, and other devices typically requiring the user to use his/her hands, other body part to physically manipulate the hardware device.

Various "hands free" controls have been developed. However, these suffer from many limitations. Those that rely on voice controls typically cannot offer the same level of precision control as through hand controls, and are limited in the number of applications in which they are suitable. Some may rely on camera systems to track user movement. However, reliance on a camera system inherently requires a continual view of the relevant parts of the user at a sufficient resolution, which limits the number of suitable applications for use.

The subject matter claimed herein is not limited to embodiments that solve any disadvantages or that operate only in environments described above. Rather, this background is only provided to illustrate exemplary technology areas where some embodiments described herein may be practiced.

BRIEF SUMMARY

The present disclosure relates to computer systems, methods, and computer storage media for using neurological data to generate a continuous motion control ("CMC") and associating the CMC with a user interface control ("UIC"). The CMC is mapped to neurological data generated while a user performs a set of physical movements within a continuous range of motion. The CMC is operable to modulate the associated UIC such that neurological signals/data generated during a user's physical movements within the continuous range of motion serve as input for controlling the UIC in a continuous/analog fashion.

At least some of the embodiments described herein provide fine, analog control of one or more user interface operations having continuous settings as opposed to a limited number of discrete settings. In some embodiments, a CMC is generated through machine learning and/or regression techniques so that neurological data are converted to scalar numbers as opposed to simply being classified into one of a limited number of discrete categories.

In some embodiments, a CMC operates through neurological data generated during physical movement of one or more of a hand, foot, face, arm, leg, head, and/or other body part. Exemplary continuous motions that may be associated with a CMC include foot flexion and extension movements, hand rotation movements, facial movements (e.g., smiling, brow furrowing, opening of eyes to various degrees, mouth opening and closing movements), arm raising and lowering movements, and other physical movements that are part of a continuous range of motion capable of being performed by a user.

In some embodiments, the UIC associated with the CMC is one or more of a display control, audio control (e.g., volume control), navigation control, system setting control, control related to an avatar or one or more other character (e.g., facial expressions or other character movements that track a user's movements), gaming controls, menu control, or other user interface operation or control.

In some embodiments, a generic CMC is constructed by obtaining neurological data generated by a plurality of users while the users perform various physical movements within a particular range of motion and mapping the obtained neurological data to those physical movements. The resulting generic CMC is then fine-tuned according to a particular user's unique neurological profile to thereby calibrate the CMC as an individualized CMC. Accordingly, the generic CMC is operable as a baseline for efficiently upgrading to an individualized CMC.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
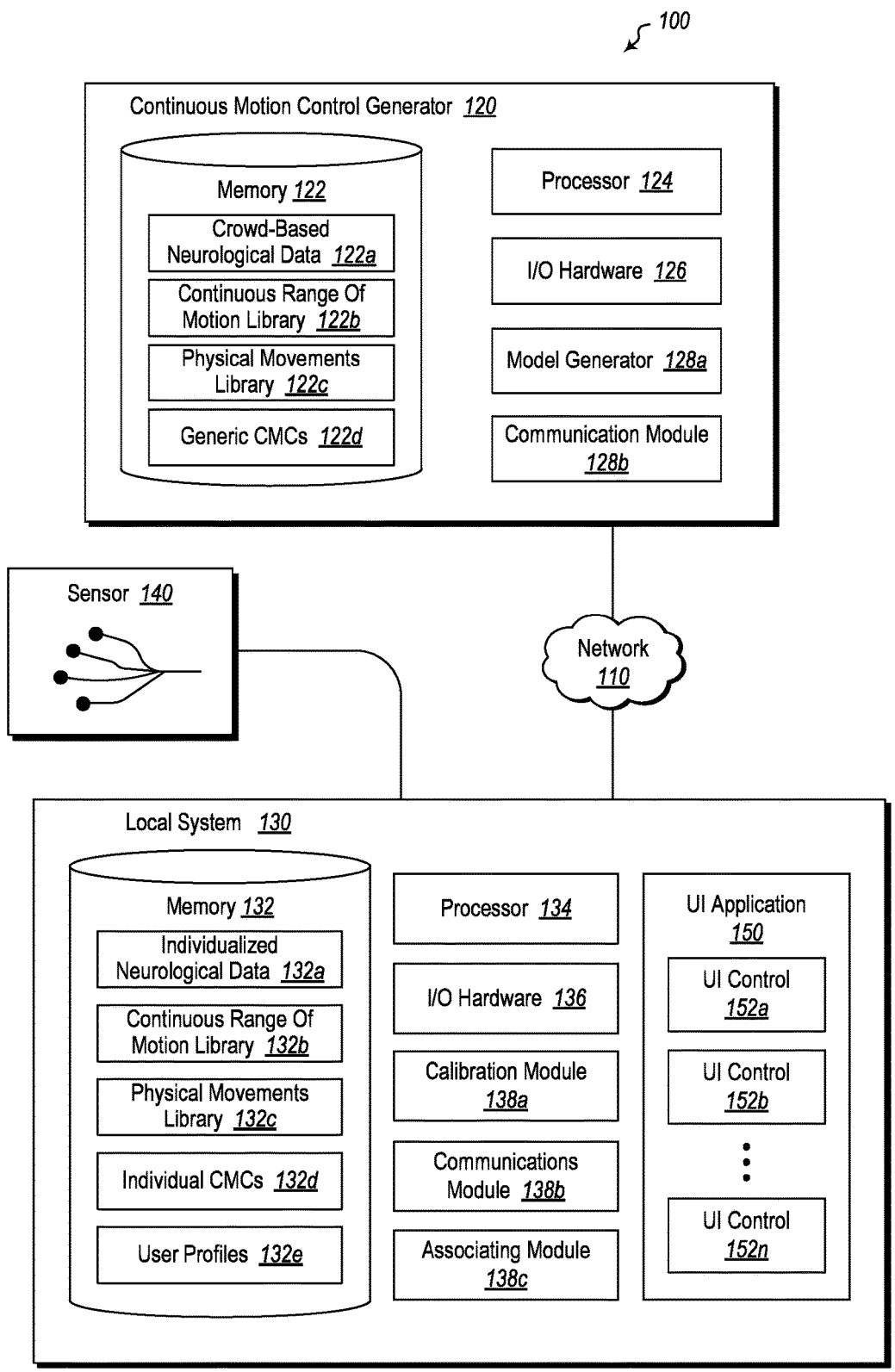
FIG. 1 illustrates a computing environment that can be used to generate a continuous motion control for analog control of a user interface control.

The present disclosure relates to computer systems, methods, and computer storage media for generating a continuous motion control ("CMC") using neurological data and for associating the CMC with a user interface control ("UIC") to enable analog control of the UIC through physical movements within a continuous range of motion. Neurological data of a user generated during physical movements within the continuous range of motion are mapped to the physical movements in order to generate the CMC. The CMC is associated with a UIC such that neurological signals generated during a user's physical movements within the continuous range of motion serve as input for controlling the UIC in a continuous/analog fashion.

Various technical effects and benefits may be achieved by implementing aspects of the disclosed embodiments. By way of example, the disclosed embodiments are operable to enable the use of neurological signals for fine control of one or more UICs without the need of a keyboard, handheld controller, mouse, joystick, and/or other traditional input hardware.

Further, by configuring the CMCs to operate using neurological data associated with a user's physical movements, the need for a camera to directly track the physical movements is reduced or eliminated. This provides hands-free controller functionality to technological environments in which such functionality was not previously feasible. For example, in various virtual reality or augmented reality technological environments, which typically rely on some form of headgear as the basic hardware platform, it is not always practical or possible to position a camera on or within the headgear in a manner that can sufficiently capture a user's physical movements, particularly any movements beyond a limited portion of the face, such as hand and foot movements.

Technical effects and benefits further include enabling control of continuous-type UICs through neurological signals, as opposed to control being limited to operations that rely on discrete category determinations (e.g., a binary on/off control). By way of example, a CMC as disclosed herein provides analog control functionality, and allows for fine, analog control of operations having continuous levels/settings as opposed to a limited number of discrete settings.

In addition, a CMC as disclosed herein is configured to provide gradient input to enable analog control of an associated user interface control. For example, in some embodiments the CMC is generated using machine learning and/or regression techniques so that neurological signals are converted to scalar numbers as opposed to simply being classified into one of a limited number of discrete classes. In this manner, the granularity of control over an associated UIC is limited only by hardware limitations and the preset or inherent granularity of the UIC itself, and not by the CMC. This is particularly true when the CMC has been tuned or otherwise customized for a particular user or set of users.

The term "continuous," as used herein with respect to "continuous motion control," "continuous user interface control," and similar terms, refers to a control that is not restricted in granularity to mere binary values or a limited set of values that are more restrictive than the restrictions that are imposed by hardware limitations, number rounding limits (e.g., rounding limits built into one or more models underlying a CMC), or other limits external to the control itself. Terms such as "analog control" therefore refer to controls having improved or increased granularity when compared to binary controls or limited set controls. Although a large number of sequentially arranged discrete categories may, in some circumstances, give the impression of a somewhat continuous control, preferred embodiments of CMCs are configured to provide a continuous gradient of at least 5 or more, at least 10 or more, at least 20 or more, at least 50 or more, or at least 100 or more measurably different levels, settings, or responses when applied to operate a UIC.

In some embodiments, a CMC involves movement of a hand, foot, face, arm, leg, head, and/or other body part. Examples of continuous motions suitable for application as continuous motion controllers include foot flexion and extension movements, hand rotation movements, facial movements (e.g., smiling, brow furrowing, opening of eyes to various degrees, mouth opening and closing movements), arm raising and lowering movements, etc.

UICs that may be associated with a CMC include display controls, audio controls (e.g., volume control), navigation controls, system setting controls, controls related to avatars or other characters (e.g., facial expressions, like the movement of a mouth or eye, or any other character movements that track a user's movements), gaming controls, and the like. Although not limited to such, CMCs disclosed herein are particularly useful for controlling continuous UICs that have a continuous gradient range of levels, settings, positions, or other responses, as opposed to a limited number of discrete settings.

Neurological signals used to gather neurological data for generating a continuous motion control and/or for powering a CMC during use may be gathered using EEG. Other embodiments may utilize neurological data gathered through other means, in addition to or alternative to EEG, such as magnetoencephalography (MEG), functional magnetic resonance imaging (fMRI), or other techniques for gathering context-based neurological data. In presently preferred embodiments and recited claims, non-invasive EEG techniques are used. It will be appreciated, however, that the scope of this application also covers embodiments in which the described/claimed EEG is replaced and/or supplemented with the MEG, fMRI and/or other context-based neurological data.

In this description and in the claims, the term "computing system" or "computer architecture" is defined broadly as including any standalone or distributed device(s) and/or system(s) that include at least one physical and tangible processor, and a physical and tangible memory capable of having thereon computer-executable instructions that may be executed by the processor(s).

FIG. 1 illustrates an exemplary computer system 100 in which a CMC is generated from neurological data and is associated with a UIC to enable analog control over the associated UIC through neurological input. The illustrated embodiment includes a CMC generator 120 in communication with a local system 130. The CMC generator 120 and the local system 130 are connected by (or are part of) a network 110, such as, for example, a Local Area Network ("LAN"), a Wide Area Network ("WAN"), and even the Internet.

As shown, the illustrated CMC generator 120 includes memory 122, and the illustrated local system 130 includes memory 132. Each of the CMC generator 120 and the local system 130 include at least one processor 124 and 134, respectively. The memory 122 and 132 may independently be physical system memory, which may be volatile, non-volatile, or some combination of the two. The term "memory" may also be used herein to refer to non-volatile mass storage such as physical storage media.

The illustrated system 100 includes an EEG sensor 140 through which a user provides neurological input to the local system 130. The CMC generator 120 and the local system 130 can include other input/output hardware 126 and 136, including one or more keyboards, mouse controls, touch screens, microphones, speakers, display screens, track balls, and the like to enable the receiving of information from a user and for displaying or otherwise communicating information to a user.

The CMC generator 120 and the local system 130 include a number of executable modules or executable components 128a-128b and 138a-138c. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

The various components illustrated in FIG. 1 represent only a few example implementations of a computer system for generating a CMC for analog control of a UIC. Other embodiments may divide the described memory/storage data, modules, components, and/or functions differently among the CMC generator 120 and the local system 130, and some embodiments may move more of the processing toward the local system 130 than the CMC generator 120, or vice versa, relative to the particular embodiment illustrated in FIG. 1. In some embodiments, memory components and/or program modules are distributed across a plurality of constituent computer systems in a distributed environment. In other embodiments, memory components and program modules are included in a single integrated computer system. Accordingly, the systems and methods described herein are not intended to be limited based on the particular location at which the described components are located and/or at which their functions are performed.

According to the illustrated embodiment, the memory 122 is used for storing crowd-based neurological data 122a, which includes neurological data (e.g., EEG signal data) gathered from a plurality of subjects. At least some of the crowd-based neurological data 122a relates to context-specific neurological data, such as particular EEG signals generated during different physical movements within a particular continuous range of motion. For example, a particular continuous range of motion may be flexion/extension of a foot, and a physical movement within the flexion/extension range may be positioning the foot at a particular angle relative to the leg (e.g., 90-160 degrees of extension from the leg). Other physical movements within the flexion/extension range may include other degrees of foot extension (besides 90-160 degrees of extension), as well as other types of positions and movements, including lateral movements, circular rotations, heal raises, toe movements and/or any other type of foot movement(s). Accordingly, the crowd-based neurological data 122a is correlated to a continuous range of motion library 122b and a physical movement library 122c for a variety of different physical movements corresponding to foot movements, as well as other body movement.

Other examples of continuous ranges of movement include degree of mouth opening, degree of eye opening, head tilting and/or turning, the rotating of a thumb about an arc (e.g., as in a "thumb joystick"), hand rotation, degree of wrist extension, degree of arm or leg raising, degree of squatting, degree of torso twisting, and/or any other continuous range of motion capable of being performed by a user.

In some embodiments, the continuous range of movement also includes a continuous range of force being applied, even when movement is not easily detected, is non-existent, or is not commensurate with the force that is applied. For instance, the range in forces applied when closing eyes, clenching a fist, pinching or flexing muscles are also capable of being mapped with EEG and other neurological data. In some instances, the scope of the disclosed embodiments for detecting a 'continuous movement' and/or 'continuous range of motion' includes the detection of the continuous gradient of forces that are applied by one or more body parts.

Additionally, the different physical movements within a given continuous range of motion may be measured/detected differently based on position (as in the example of different degrees of foot extension) or based on some other variable, such as the velocity or speed of the movement. By way of example, for a continuous range of motion defined as a hand-swiping motion, different physical movements within the range of motion may include the angular degree of the hand swipe (i.e., a position-based variable) and/or may include the velocity of the hand or finger(s) during the swiping action (i.e., a speed-based variable). Such embodiments are particularly useful for controlling UICs that operate along similar variables. For example, a menu of options presented in a carousel format can be controlled through a hand swiping motion, with the carousel configured to spin with a speed proportional to the speed of the hand-swipe.

Preferably, for each continuous range of motion, the related neurological data includes neurological signals associated with enough different physical movements within the continuous range of motion, collected from enough different subjects, to generate a generic CMC 122d for the continuous range of motion, as explained in more detail below.

The illustrated CMC generator 120 includes a model generator 128a configured to receive the crowd-based neurological data 122a, and for a particular continuous range of motion, to generate a model that maps/relates the neurological data to the physical movements within the continuous range of motion. In some embodiments, the model generator 128a includes signal processing functionality to provide filtering (e.g., low and/or high band-pass filtering and/or filtering of delta and gamma EEG waves), artifact removal (e.g., removal of common EEG artifacts known to be associated with blinks, yawns, audio or visual stimulation, or other data and movements that are not correlated to the targeted movement of a particular application), and/or other processing of one or more signals of the crowd-based neurological data 122a.

In some embodiments, the model generator 128a is operable to perform regression analysis on the crowd-based neurological data 122a to determine the corresponding generic CMCs 122d. For example, different physical movements within a particular continuous range of motion may be correlated to different percentages of the power spectrum (e.g., as determined through Fourier analysis) within the different wave bands (alpha, beta, gamma, delta) of the corresponding EEG signals, may be correlated to an amount of phase and/or magnitude synchrony, and/or may be correlated to other characteristics of the corresponding EEG signals.

In preferred embodiments, the model generator 128a is configured to use machine learning techniques to correlate EEG signal information to corresponding physical movements within a particular continuous range of motion in order to generate a predictive model that is operable to generate signals that reflect or associate physical movements (position, speed, force, etc.), as output, based on detected neurological signal input.

As shown, the CMC generator 120 also includes a communication module 128b configured to enable the CMC generator 120 to communicate with one or more other systems, including the local system 130 (e.g., in conjunction with communication module 138b). In some embodiments, the communication modules 128b and 138b provide application programming interfaces (APIs) that enable the respective systems to communicate and share data with one another and/or with other systems (including other systems within a distributed computing environment).

In the illustrated embodiment, the local system 130 includes memory 132. Memory 132 includes individualized neurological data 132a, which includes neurological data (e.g., EEG signal data) associated with an identified individual. For example, the individualized neurological data 132a may be associated with user profiles 132e. As with the crowd-based neurological data 122a, the individualized neurological data 132a includes neurological data from different physical movements (e.g., stored in physical movements library 132c) within a particular continuous range of motion (e.g., as stored in continuous range of motion library 132b). However, each piece of individualized neurological data 132a is associated with a specific individual such that, for a particular continuous range of motion, a set of an individual's EEG signatures are associated with a corresponding set of the individual's physical movements within the continuous range of motion.

The illustrated local system 130 also includes a calibration module 138a configured to tune or otherwise modify a generic CMC to a specific individual or set of individuals, according to the individualized neurological data 132a corresponding to the individual(s). For example, for a particular continuous range of motion, the calibration module 138a operates to associate the individual's corresponding neurological data 132a to the corresponding generic CMC received from the CMC generator 120. The calibration module 138a operates to adjust/customize the generic CMC to the specific individual(s). In some instances, the calibrated CMCs are stored as individualized CMCs 132d at the local system 130. Although, they may also be stored at a location remote to the local system 130. For instance, the individualized CMCs 132d may be stored at a third party game server that accesses and applied the individualized CMCs 132d, when necessary.

The calibration module 138a can provide a number of advantages. Because a specific individual will typically not produce exactly the same EEG signature as another individual, even for the same physical movements, use of the calibration module 138a can better tailor the CMC to the specific individual, providing better and more accurate responsiveness when the individualized CMC is associated with a UIC and put into use. In addition, despite the differences, EEG signatures for a particular physical movement will have many similarities across all or most users. Certain embodiments disclosed herein therefore provide a generic CMC generated from the neurological data of a plurality of users, the generic CMC establishing a baseline from which an individual CMC can be tailored and fine-tuned, if desired.

When the CMC is tuned for a limited group of users (e.g., a family, a team, a company, etc.), based on trained data for the group, the customized CMC will still provide better accuracy and effective control than the generic CMC that is based on all users.

Another example of a benefit of this configuration is that it provides a user or defined group with the option for immediate use of a generic CMC or the option to set up a customized CMC. For example, a guest user may only want to use an application for a short time, and may not want to first set up a personal profile or run through an initiation sequence to establish a CMC. In many instances, the generic CMC will provide sufficient responsiveness and accuracy to allow the user to begin immediate use of the application and control of one or more UICs within the application with little to no initial setup of the CMC. At the same time, other users may wish to establish more customized and/or better tailored CMCs that improve upon the default generic CMC. These users may utilize the calibration module 138a to generate their respective individualized CMCs 132d.

As shown, the local system 130 also includes a user interface application ("UI application") 150 operable on the local system 130. The UI application 130 may be a video game, a virtual reality or augmented reality simulator, an audio or audiovisual service, a word processor, a spreadsheet application, a database manager, or any other application capable of receiving input through one or more UICs. The illustrated UI application 150 includes a number of UICs 152a to 152n (referred to generically as 152). As described herein, the UICs 152 may be display controls, audio controls, character movement or character action controls, menu controls, navigation controls, or other controls by which a user interacts with the application 150 to modulate input or output, settings, parameter levels, etc.

The local system 130 includes an associating module 138c configured to associate one or more CMCs (either generic CMCs 122d or individualized CMCs 132d) with one or more corresponding UICs 152 of the application 150. In some embodiments, the association may be configured according to user preferences and selections. For example, a user may wish to associate a particular range of motion with a particular UIC 152, and may wish to define the relationship between the physical movements of the range of motion and the response of the UIC 152. In other embodiments, one or more CMCs are automatically assigned to particular UICs 152 (e.g., by default). For example, the particular application 150 running on the local system 130 may define the relationship between the one or more CMCs and the one or more UICs. By way of example, an application 150 may define what range of motion, and therefore what CMC, controls a particular UIC, and/or may define what physical movements within the range of motion correspond to responses of the particular UIC according to pre-set or default application settings.

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 122 of the CMC generator 120, the memory 132 of a local system 130, and/or in one or more separate computer system components (e.g., in a distributed computer system environment).

Figure 2:
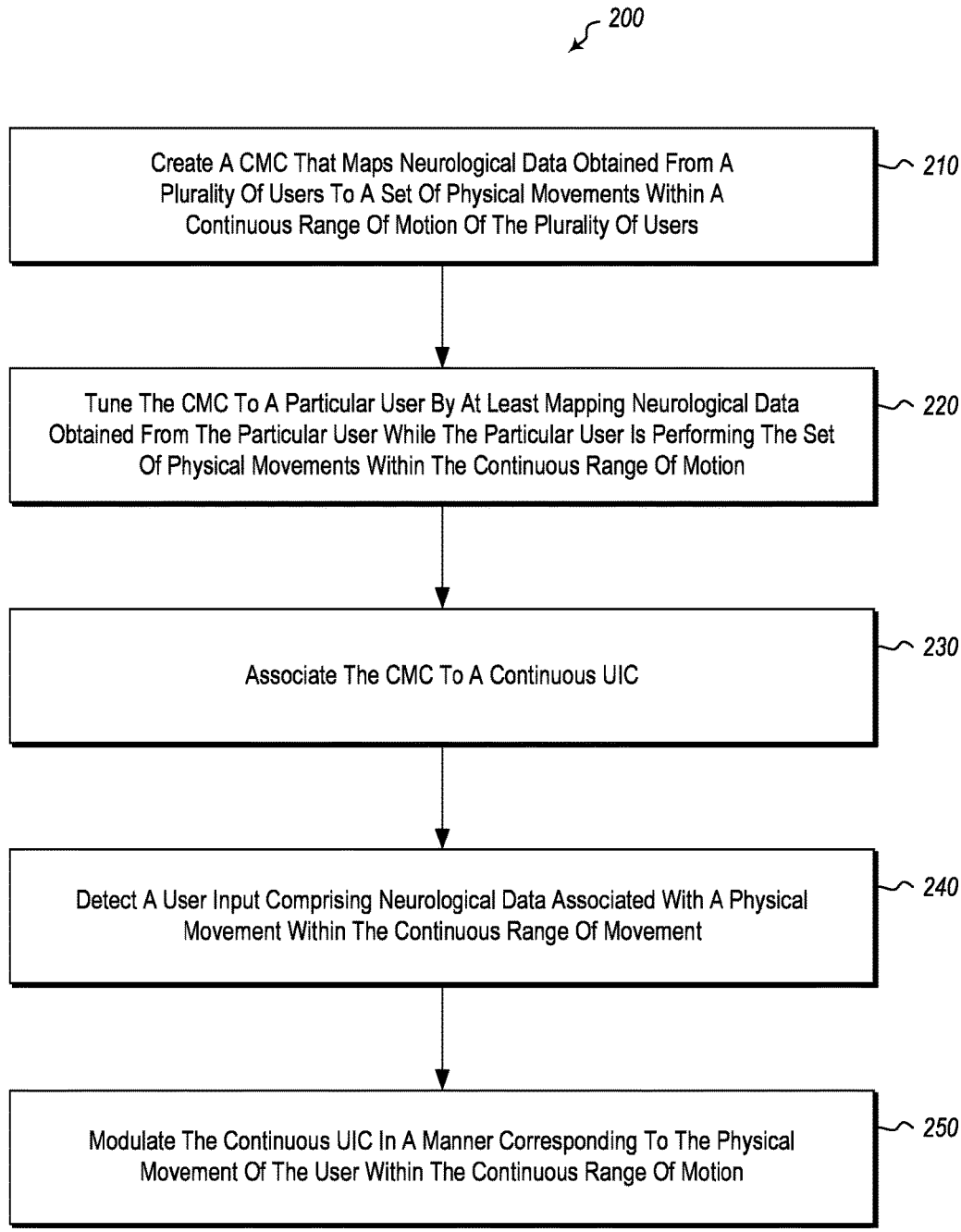
FIG. 2 illustrates a flowchart of an exemplary method for using neurological data to modulate a continuous user interface control.

The computer-executable instructions may be used to implement and/or instantiate all of the functionality disclosed herein, including the functionality that is disclosed in reference to the flow diagram of FIG. 2.

FIG. 2 is a flowchart 200 of a method for using neurological data to modulate a continuous user interface control. A computer system creates a CMC that maps neurological data obtained from a plurality of users to a set of physical movements within a continuous range of motion of the plurality of users (act 210). The mapping may be a mapping that uses averaging, best fit algorithms or any other statistical or correlation mapping algorithms.

The act of creating the CMC (act 210) optionally includes obtaining the neurological data from a plurality of users and building a database of obtained neurological data from a plurality of users. This may be accomplished, for example, by measuring EEG data for a plurality of users, as described above, while the users perform certain tasks. Alternatively, or additionally, act 210 further includes accessing the stored neurological data from a database that already contains the stored data from a plurality of users. The CMC data may be mapped to all users, to discrete groups of users and to individual users.

As described herein, the continuous range of motion may include movements of a hand, foot, arm, leg, face, head, or other body part, and the different physical movements within the continuous range of movement may be differentiated based on position within the range of motion (e.g., rotation angle of hand, height arm is raised), direction of movement (e.g., clockwise rotation vs. counterclockwise rotation, flexion vs. extension, etc.), force(s) exerted (with or without a change in relative position), and/or speed of movement through all or part of the range of motion (e.g., speed at which hand is swiped).

The computer system then tunes/calibrates the CMC to a particular user (or group) by at least mapping neurological data obtained from the particular user (or group) while the particular user is performing the set of physical movements within the continuous range of motion (act 220). When the CMC is tuned to a group, the group averages may be used to define the limits and rates of change for applying the CMC during use by the group.

It will be appreciated that the creation of a first baseline/generic CMC, which is subsequently tuned for specific individual(s), is particularly beneficial for enabling broad application and scalability to the disclosed applications of use. For instance, in at least some embodiments, this process saves overall time and processing requirements required to build a plurality of CMCs that are customized to particular individuals and/or groups, rather than requiring their construction from scratch.

The computer system then associates the CMC to a continuous UIC (act 230). As described by the foregoing, the UIC may be a display control, audio control, character movement or character action control, menu control, navigation control, or other control by which a user interacts with a user interface to modulate input or output, settings, parameter levels, and the like. The embodiments described herein are particularly useful with continuous UICs that operate with a continuous range of settings/responses as opposed to a limited number of discrete settings/responses.

In the illustrated embodiment, the computer system subsequently detects a user input comprising neurological data associated with a physical movement within the continuous range of movement (act 240). In presently preferred embodiments, the neurological data is received by the computer system from an EEG sensor or other sensor worn by the user. In some embodiments, this data is obtained as the user performs the physical movement. In other embodiments, the data is obtained as the user simply focuses on performing the physical movement, similar to how an amputee might think about moving an amputated limb.

Figure 3:
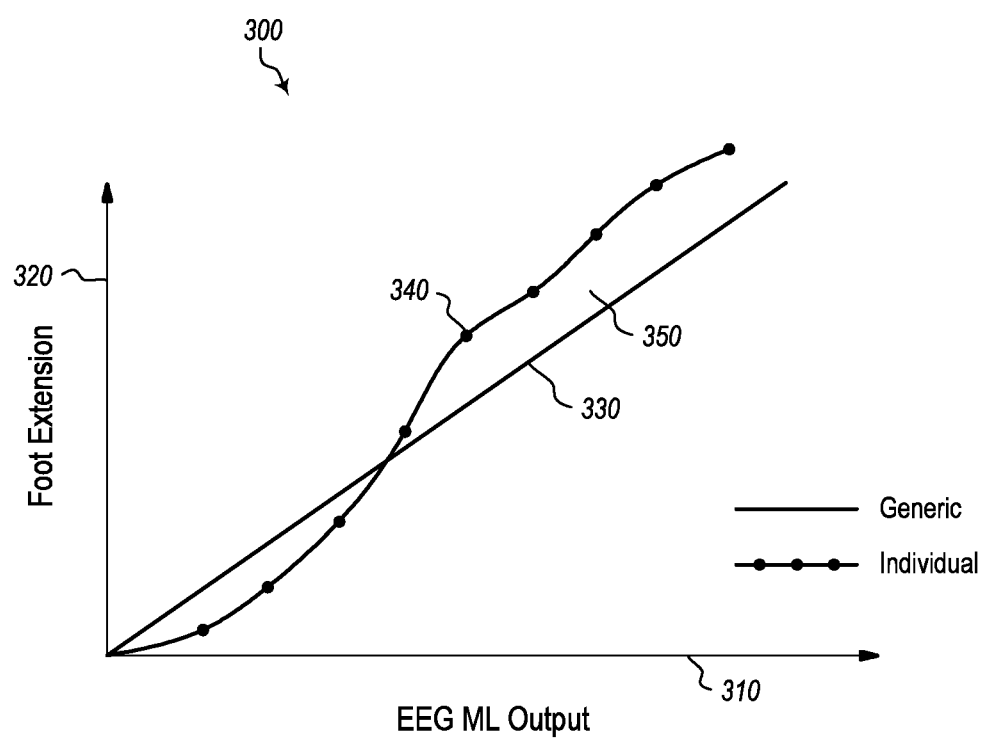
FIG. 3 illustrates EEG data representing a generic continuous motion control and individual EEG data generated by a particular user for use in a continuous motion control calibration process.

The computer system uses the generated CMC to modulate the continuous UIC in a manner that correlates with the physical movement of the user within the continuous range of motion (act 250). For example, the position, direction, force and/or speed of the particular physical movement can define the response of the continuous UIC. FIG. 3 illustrates an exemplary calibration step for generating an individualized CMC based on a generic CMC modified according to the individual's neurological data. FIG. 3 illustrates a chart 300 showing, for a particular continuous range of motion, the relationship between EEG machine learning output (axis 310) and the predicted relative degree of physical movement within the continuous range of motion (axis 320). As described by the foregoing, some embodiments utilize machine learning techniques for discovering correlations and relationships between one or more physical movements and the EEG data generated during those movements. The illustrated EEG machine learning output therefore represents one or more EEG data characteristics determined to be correlated with physical movements within the continuous range of motion.

In this particular example, the EEG machine learning output is related to the degree of extension of a foot. The chart 300 illustrates a representation of a generic CMC (series 330) showing a determined relationship between EEG output and foot extension based on the EEG data of a plurality of subjects. The chart 300 also illustrates a plurality of data points (series 340) representing a particular individual's EEG output (according to the determined machine learning variables) and corresponding degree of foot extension associated with those EEG outputs.

The series 340 is generated during a calibration process. For example, an application can guide the user to extend his/her foot at a number of different degrees of extension while the corresponding EEG data are gathered. The number of data points collected may vary. In some embodiments, the number, concentration, and/or granularity of data points collected depends on the particular range of motion involved, user preferences, level of fine-tuning desired from the calibration process, sensitivity of hardware, and/or timing preferences, for example.

As shown, the resulting individual series 340 is not completely aligned with the generic series 330. An individualized CMC is generated by adjusting the corresponding generic CMC by the calibration offset (represented by spaces 350) to arrive at the individualized CMC.

The following examples represent operation and functionality of various continuous UICs associated with continuous CMCs. The examples are illustrative only. The illustrated UICs may be associated with other CMCs (i.e., other arrangements of ranges of motion and/or physical movements within the range of motion), and vice versa. In addition, other embodiments include other CMCs based on other physical movements and ranges of motion and/or other UICs.

Figure 4A:
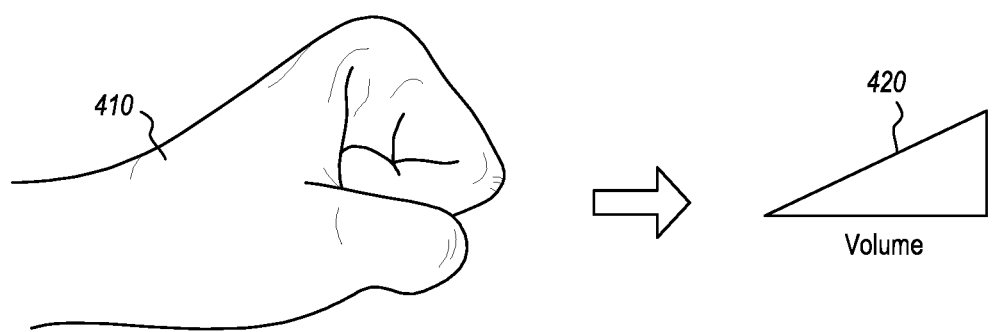
FIGS. 4A-4C illustrate operation of an exemplary continuous motion control configured to function according to motion of a user's hand to modulate a volume control.
Figure 4B:
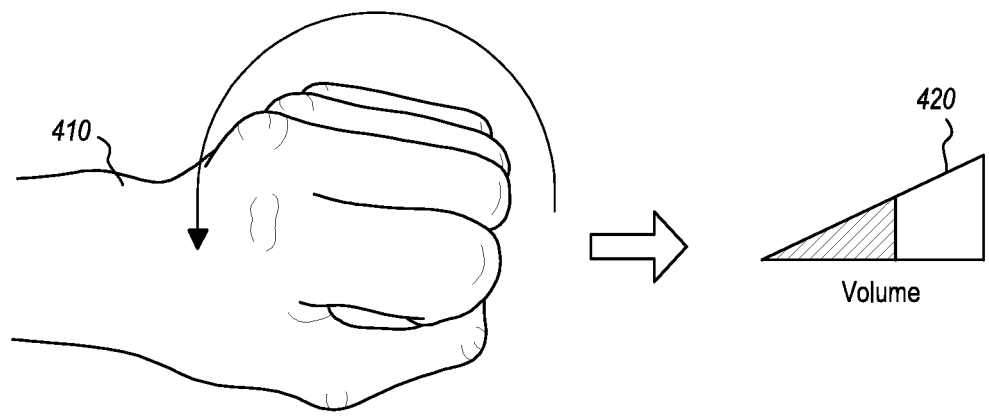
Figure 4C:
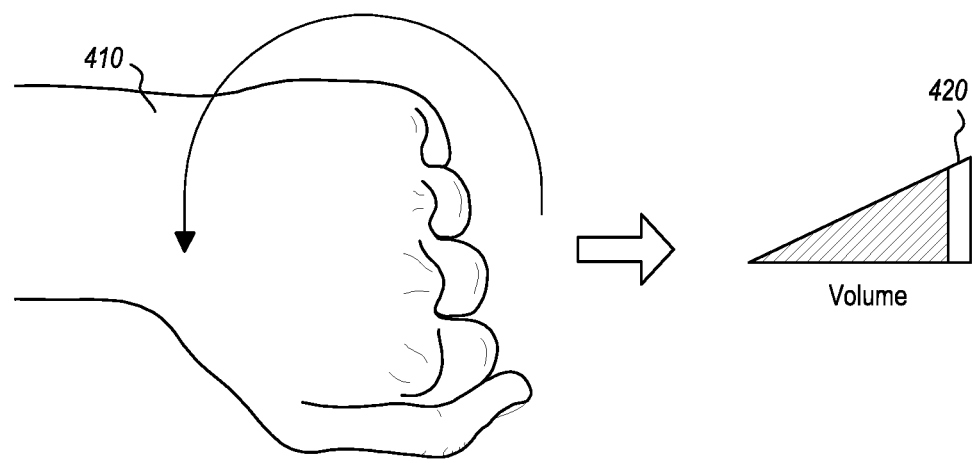

FIGS. 4A-4C illustrate operation of a CMC configured to function according to rotation of a user's hand 410 in order to modulate a volume control 420. As shown in FIG. 4A, the CMC is configured so that as the user's hand 410 is in a first position, with the knuckles up at 0 degrees, the corresponding volume control 420 is set at zero. FIG. 4B illustrates that as the user rotates his/her hand 410 to a second position, the corresponding neurological signature generated by the user causes the volume control 420 to respond with a corresponding increase in volume level. FIG. 4C illustrates that as the user rotates his/her hand 410 even further to a third position, the corresponding neurological signature generated by the user causes the volume control 420 to further respond with a corresponding further increase in volume level. In some embodiments, rotation in the opposite direction operates to decrease the volume level. Although FIGS. 4A-4C show distinct volume levels at distinct hand rotation positions, it should be understood that a continuous range of volume levels between each illustrated position are possible, according to relative hand rotation positions between the illustrated hand rotation positions.

Figure 5A:
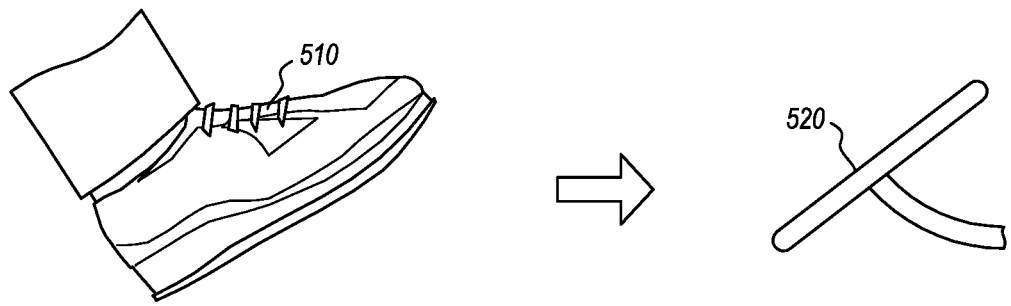
FIGS. 5A-5C illustrate operation of an exemplary continuous motion control configured to function according to motion of a user's foot to modulate a virtual pedal.
Figure 5B:
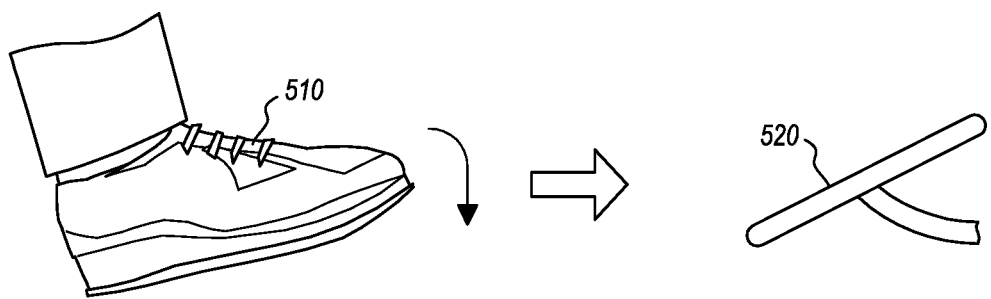
Figure 5C:
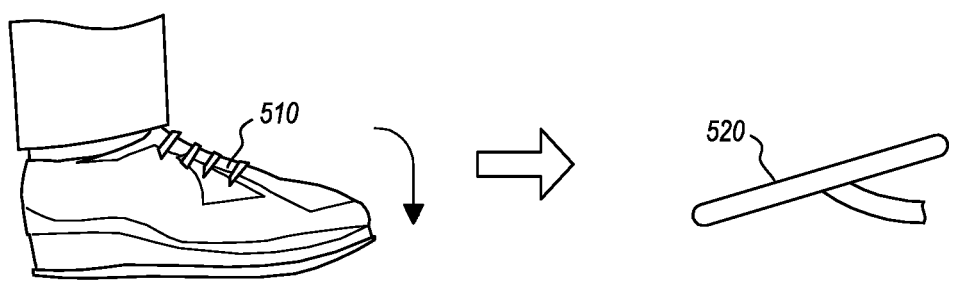

FIGS. 5A-5C illustrate operation of a CMC configured to function according to degree of extension of a user's foot 510 in order to modulate depression of a virtual gas pedal 520 in a video game application. As shown in FIG. 5A, the CMC is configured so that as the user's foot 510 is positioned at full flexion, the corresponding virtual gas pedal 520 is positioned in an upright (and not depressed) position. FIG. 5B illustrates that as the user extends his/her foot 510 to a more extended position, the corresponding neurological signature generated by the user causes the virtual gas pedal 520 to respond with a corresponding degree of depression. FIG. 5C illustrates that as the user extends his/her foot 510 even further, the corresponding neurological signature generated by the user causes the virtual gas pedal 520 to further respond with a corresponding further degree of depression. Although FIGS. 5A-5C show distinct gas pedal positions in relation to distinct foot extension positions, it should be understood that a continuous range of gas pedal positions are possible in between the illustrated positions, corresponding to the continuous range of foot extension of the user.

Figure 6A:
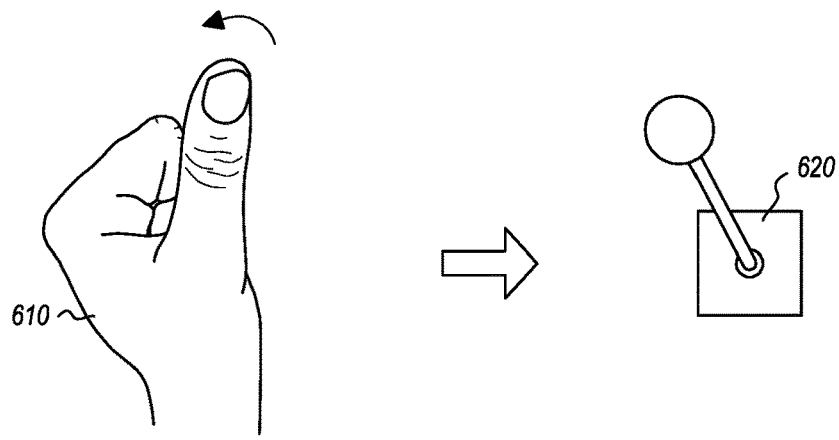
FIGS. 6A-6C illustrate operation of an exemplary continuous motion control configured to function according to motion of a user's thumb to modulate a virtual joystick.
Figure 6B:
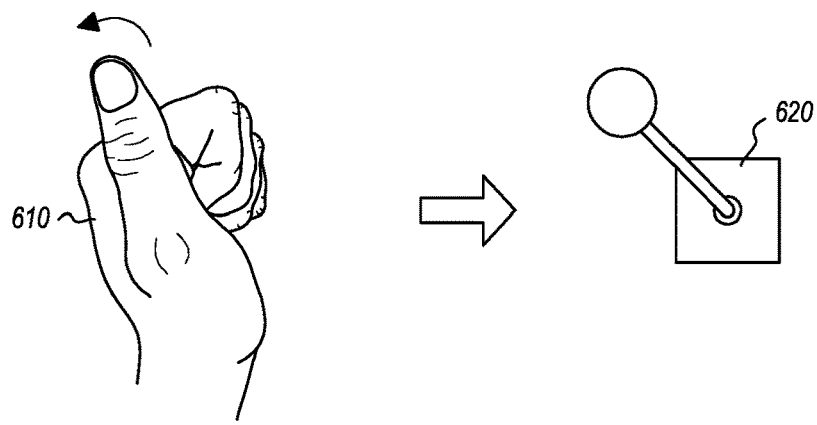
Figure 6C:
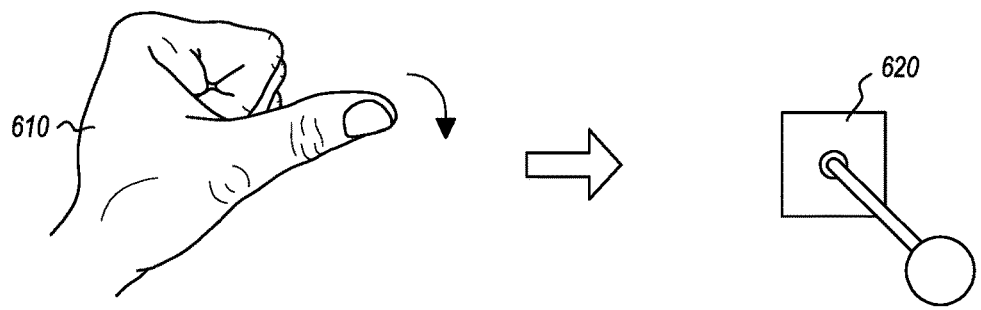

FIGS. 6A-6C illustrate operation of a CMC configured to function according to movements of a user's thumb 610 (e.g., combinations of flexion, extension, abduction, adduction, and opposition movements) in order to modulate actuation of a virtual joystick 620. As shown in FIG. 6A, the CMC is configured so that as the user's thumb 610 is flexed and slightly adducted (the thumb of a left hand, in this example), the corresponding neurological signature generated by the user causes the virtual joystick 620 to be positioned a corresponding degree upwards and slightly to the left. FIG. 6B illustrates that as the user further adducts his/her thumb 610, the corresponding neurological signature generated by the user causes the virtual joystick 620 to be positioned a corresponding degree further to the left. FIG. 6C illustrates that as the user shifts his/her thumb to an abducted and more extended position, the corresponding neurological signature generated by the user causes the virtual joystick 620 to move to a downward/right diagonal position. Although FIGS. 6A-6C show distinct joystick positions in relation to distinct thumb positions, it should be understood that other positions corresponding to other thumb positions/movements are possible, and that a continuous range of joystick positions are possible in between the illustrated positions or other positions, corresponding to the continuous ranges of thumb movements of the user.

Figure 7A:
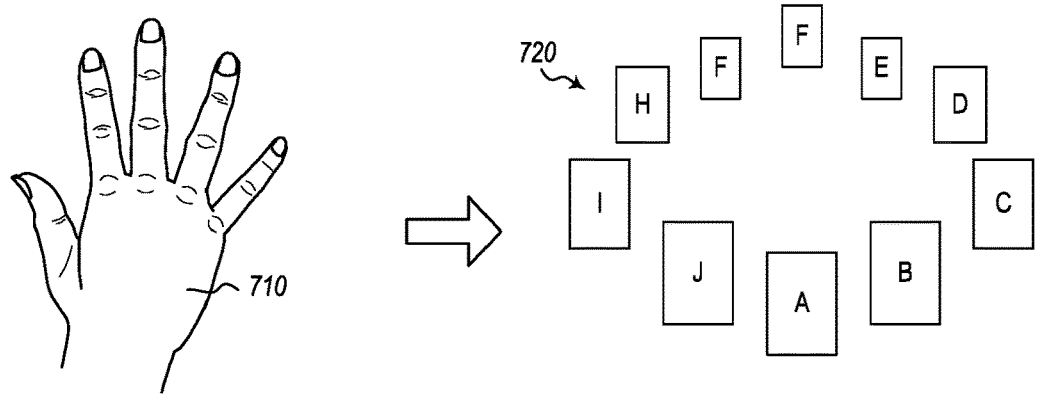
FIGS. 7A-7C illustrate operation of an exemplary continuous motion control configured to function according to a hand swiping motion to modulate a carousel menu.
Figure 7B:
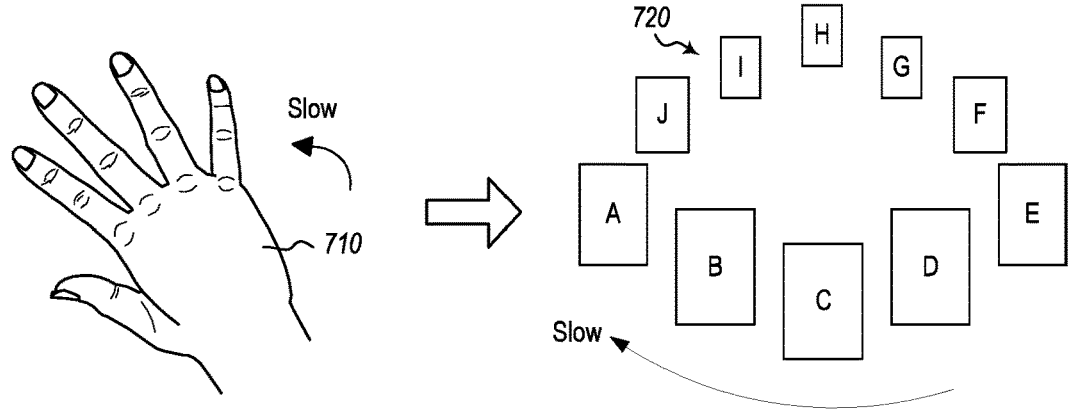
Figure 7C:
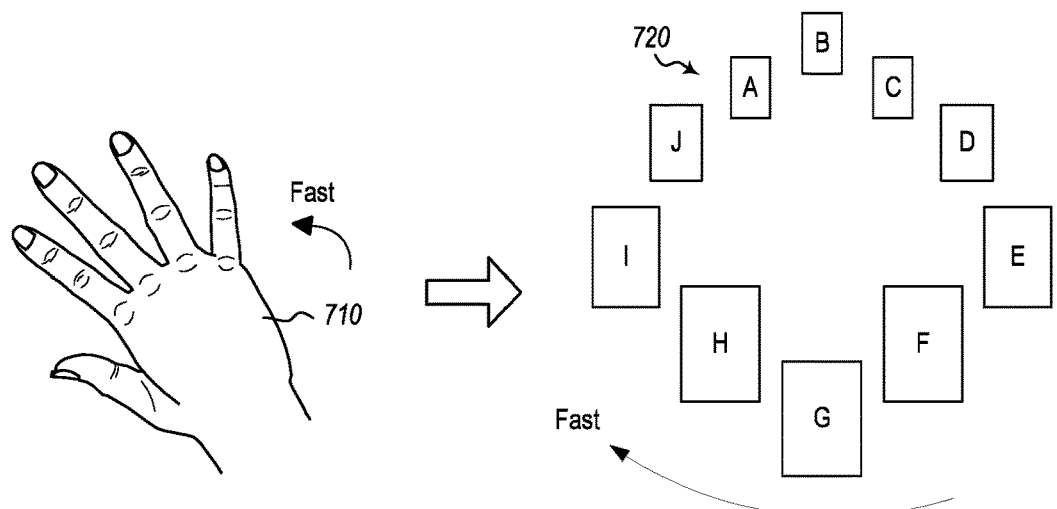

FIGS. 7A-7C illustrate operation of a CMC configured to function according to the swipe speed of a user's hand 710 in order to modulate rotation of a carousel menu 720. As shown in FIG. 7A, the CMC is configured so that as the user's hand 710 is held still, the corresponding carousel menu is held still. FIG. 7B illustrates that as the user swipes his/her hand 710 in a relatively slow motion, the corresponding neurological signature generated by the user causes the carousel menu 720 to respond with a correspondingly slow rotation. FIG. 7C illustrates that as the user swipes his/her hand 710 in a relatively fast manner, the corresponding neurological signature generated by the user causes the carousel menu 720 to respond with a correspondingly fast rotation. Other rotation speeds are also possible at various intermediate degrees, in a continuous fashion, according to relative hand swipe speed.

While specific examples of use have been provided, it will be appreciated that the scope of this disclosure also applies to other uses, including uses in which EEG based on detected force/pressure is used to modulate the CMC. Likewise, applications of use include other UI controls, such as controls for changing brightness of a display or lighting or filter levels that are applied. The applications of use and CMCs that are controllable through application of this disclosure also include controls for mechanical tools and machinery, such as controls for moving and operating robotic arms and other tools.

Embodiments of the present invention may comprise or utilize a special-purpose or general-purpose computer system that includes computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, virtual or augmented reality headsets, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system configured for using neurological data to modulate a continuous user interface control, the computer system comprising:
   one or more processors; and
   one or more hardware storage devices having stored thereon computer-executable instructions which are executable by the one or more processors to cause the computing system to perform at least the following:
      obtain a generic continuous motion control that maps neurological data obtained from a plurality of users to a set of physical movements within a continuous range of motion of the plurality of users, wherein the generic continuous motion control is sufficient to provide limited responsiveness and accuracy when associated to a generic continuous user interface control to modulate the generic continuous user interface control in response to detected physical movement within the continuous range of motion;
      tune the generic continuous motion control to generate a continuous motion control for a particular user by at least mapping neurological data obtained from the particular user while the particular user is performing the set of physical movements within the continuous range of motion;
      associate the continuous motion control to a continuous user interface control;
      detect user input comprising neurological data associated with a physical movement within the continuous range of motion; and
      modulate the continuous user interface control in a manner corresponding to the physical movement of the user within the continuous range of motion.

2. The computing system of claim 1, wherein the set of physical movements within the continuous range of motion includes physical movements that are differentiated from one another based on relative position of a body part within the continuous range of motion.

3. The computing system of claim 1, wherein the set of physical movements within the continuous range of motion includes physical movements that are differentiated from one another based on relative speed at which the physical movements are made within the continuous range of motion.

4. The computing system of claim 1, wherein the continuous range of motion includes movements of a hand, foot, arm, leg, face, or head.

5. The computing system of claim 1, wherein the set of physical movements within the continuous range of motion includes physical movements that are differentiated from one another based on relative force.

6. The computing system of claim 1, wherein the continuous user interface control is an audio volume level control.

7. The computing system of claim 1, wherein continuous user interface control is operable in a virtual reality or an augmented reality environment.

8. The computing system of claim 1, wherein the continuous user interface control is operable with a continuous range of settings as opposed to a limited number of discrete settings.

9. The computing system of claim 1, wherein the user input comprising neurological data is obtained from an electroencephalography sensor contemporaneously worn by the user.

10. The computing system of claim 1, wherein the continuous motion control is operable to modulate the continuous user interface control without input obtained from a camera.

11. The computing system of claim 1, wherein the continuous user interface control is a virtual analog joystick.

12. The computing system of claim 11, wherein the continuous motion control is operable to modulate the virtual analog joystick through a set of thumb movements.

13. The computing system of claim 1, wherein the continuous motion control is operable to modulate the continuous user interface control through foot movements.

14. The computing system of claim 1, wherein the continuous motion control is operable to modulate the continuous user interface control through facial movements.

15. The computing system of claim 1, wherein the continuous motion control maps neurological data obtained from a plurality of users using machine learning techniques.

16. A computer-implemented method for using neurological data to modulate a continuous user interface control, the method being implemented by a computing system that includes at least one processor and one or more hardware storage devices having stored thereon computer-executable instructions that are executable by the at least one processor to cause the computing system to implement the method, the method comprising:

obtaining a generic continuous motion control that maps neurological data obtained from a plurality of users to a set of physical movements within a continuous range of motion of the plurality of users, wherein the generic continuous motion control is sufficient to provide limited responsiveness and accuracy when associated to a generic continuous user interface control to modulate the generic continuous user interface control in response to detected physical movement within the continuous range of motion;

tuning the generic continuous motion control to generate a continuous motion control for a particular user by at least mapping neurological data obtained from the particular user while the particular user is performing the set of physical movements within the continuous range of motion;

associating the continuous motion control to a continuous user interface control;

detecting user input comprising neurological data associated with a physical movement within the continuous range of motion; and modulating the continuous user interface control in a manner corresponding to the physical movement of the user within the continuous range of motion.

17. The method of claim 16, wherein the set of physical movements within the continuous range of motion includes physical movements that are differentiated from one another based on relative position of a body part within the continuous range of motion and based on relative speed at which the physical movements are made within the continuous range of motion.

18. The method of claim 16, wherein the continuous motion control is operable to modulate the continuous user interface control in an analog fashion.

19. The method of claim 16, wherein the continuous motion control is operable to modulate the continuous user interface control without input obtained from a camera.

20. One or more hardware storage device having stored thereon computer-executable instructions which are executable by one or more processors of a computing system to use neurological data to modulate a continuous user interface control by at least causing the computer system to perform a method that includes the following:

obtaining a generic continuous motion control that maps neurological data obtained from a plurality of users to a set of physical movements within a continuous range of motion of the plurality of users, wherein the generic continuous motion control is sufficient to provide limited responsiveness and accuracy when associated to a generic continuous user interface control to modulate the generic continuous user interface control in response to detected physical movement within the continuous range of motion;

tuning the generic continuous motion control to generate a continuous motion control for a particular user by at least mapping neurological data obtained from the particular user while the particular user is performing the set of physical movements within the continuous range of motion;

associating the continuous motion control to a continuous user interface control;

detecting user input comprising neurological data associated with a physical movement within the continuous range of motion; and modulating the continuous user interface control in a manner corresponding to the physical movement of the user within the continuous range of motion.

* * * * *